US012722344B2

(12) United States Patent
Tsunoya et al.

(10) Patent No.: US 12,722,344 B2
(45) Date of Patent: Sep. 1, 2026

(54) INFORMATION PROCESSING APPARATUS AND THREE-DIMENSIONAL SHAPING SYSTEM

(71) Applicant: SEIKO EPSON CORPORATION, Tokyo (JP)

(72) Inventors: Akihiko Tsunoya, Okaya (JP); Takayuki Yokoyama, Matsumoto (JP)

(73) Assignee: SEIKO EPSON CORPORATION (JP)

( * ) Notice: Subject to any disclaimer, the term of this patent is extended or adjusted under 35 U.S.C. 154(b) by 83 days.

(21) Appl. No.: 18/657,845

(22) Filed: May 8, 2024

(65) Prior Publication Data

US 2024/0375355 A1 Nov. 14, 2024

(30) Foreign Application Priority Data

May 9, 2023 (JP) ................................ 2023-077086

(51) Int. Cl.
*B29C 64/393* (2017.01)
*B29C 64/209* (2017.01)
(Continued)

(52) U.S. Cl.
CPC .......... *B29C 64/393* (2017.08); *B29C 64/209* (2017.08); *B29C 64/236* (2017.08); *B33Y 30/00* (2014.12); *B33Y 50/02* (2014.12)

(58) Field of Classification Search
CPC ... B29C 64/393; B29C 64/209; B29C 64/236; B33Y 50/02; B33Y 30/00
See application file for complete search history.

(56) References Cited

U.S. PATENT DOCUMENTS

2017/0266884 A1 9/2017 Maeda
2018/0068774 A1* 3/2018 Wang .................. H01F 41/0246
(Continued)

FOREIGN PATENT DOCUMENTS

JP 2016-536178 A 11/2016
JP 2017-165041 A 9/2017
(Continued)

OTHER PUBLICATIONS

Shin (2016 IEEE), An Effective Data Structure for a 3D Printing Slicer API Hwa Seon Shin (Year: 2016).*

*Primary Examiner* — Jamel M Nelson
*Assistant Examiner* — Erica Hartsell Funk
(74) *Attorney, Agent, or Firm* — Harness, Dickey & Pierce, P.L.C.

(57) ABSTRACT

An information processing apparatus for generating three-dimensional shaping data includes: a generation unit configured to generate, based on shaping path information indicating a shaping path of a first slice layer among a plurality of slice layers, the three-dimensional shaping data including execution command information indicating a command to be executed at each position on the shaping path; an acquisition unit configured to acquire first line segment length information indicating a length of a first line segment among line segments included in the shaping path, second line segment length information indicating a length of a second line segment different from the first line segment among the line segments included in the shaping path, first line segment direction information indicating a direction in which the first line segment extends, and second line segment direction information indicating a direction in which the second line segment extends; and a change unit configured to change the execution command information based on the first line segment length information, the second line segment length information, the first line segment direction (Continued)

information, and the second line segment direction information.

6 Claims, 7 Drawing Sheets

(51) Int. Cl.

| | |
|---|---|
| ***B29C 64/236*** | (2017.01) |
| ***B33Y 30/00*** | (2015.01) |
| ***B33Y 50/02*** | (2015.01) |

(56) References Cited

U.S. PATENT DOCUMENTS

2018/0071986 A1* 3/2018 Buller .................... B22F 10/80
2019/0125681 A1* 5/2019 Albed Alhnan ....... B33Y 50/02
2019/0283320 A1 9/2019 Mizukami et al.

FOREIGN PATENT DOCUMENTS

JP 2019-155833 A 9/2019
JP 2020-011474 A 1/2020
WO 2015/042422 A1 3/2015
WO WO-2019236493 A1 * 12/2019 ........... B29C 64/209

* cited by examiner

FIG. 5

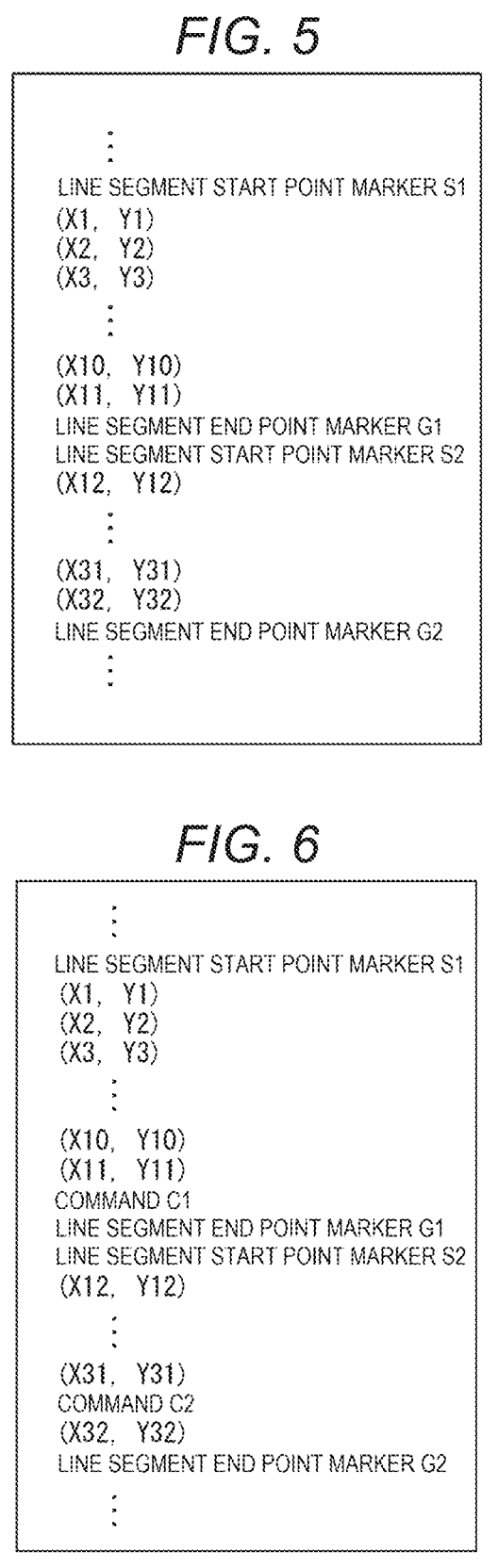

⋮
LINE SEGMENT START POINT MARKER S1
(X1, Y1)
(X2, Y2)
(X3, Y3)
⋮
(X10, Y10)
(X11, Y11)
LINE SEGMENT END POINT MARKER G1
LINE SEGMENT START POINT MARKER S2
(X12, Y12)
⋮
(X31, Y31)
(X32, Y32)
LINE SEGMENT END POINT MARKER G2
⋮

FIG. 6

⋮
LINE SEGMENT START POINT MARKER S1
(X1, Y1)
(X2, Y2)
(X3, Y3)
⋮
(X10, Y10)
(X11, Y11)
COMMAND C1
LINE SEGMENT END POINT MARKER G1
LINE SEGMENT START POINT MARKER S2
(X12, Y12)
⋮
(X31, Y31)
COMMAND C2
(X32, Y32)
LINE SEGMENT END POINT MARKER G2
⋮

FIG. 7

| LENGTH OF FIRST LINE SEGMENT [mm] | LENGTH OF SECOND LINE SEGMENT [mm] | ANGLE [° ] | NECESSITY OF CHANGE | CHANGE TARGET | CHANGE CONTENT | . . . |
|---|---|---|---|---|---|---|
| 10 | 10 | 150 | NO | – | – | . . . |
| 10 | 10 | 90 | YES | FIRST LINE SEGMENT | DECREASE ROTATION SPEED OF FIRST MOTOR FROM 0.5 SECONDS BEFORE | . . . |
| 1 | 1 | 90 | YES | FIRST LINE SEGMENT | DECREASE ROTATION SPEED OF FIRST MOTOR FROM 1.2 SECONDS BEFORE | . . . |
| | | | | SECOND LINE SEGMENT | INCREASE ROTATION SPEED OF FIRST MOTOR AFTER 0.4 SECONDS | |
| 1 | 10 | 90 | YES | FIRST LINE SEGMENT | DECREASE ROTATION SPEED OF FIRST MOTOR FROM 1.2 SECONDS BEFORE | . . . |
| 1 | 10 | 150 | NO | – | – | . . . |
| 10 | 1 | 90 | YES | FIRST LINE SEGMENT | DECREASE ROTATION SPEED OF FIRST MOTOR FROM 0.5 SECONDS BEFORE | . . . |
| | | | | SECOND LINE SEGMENT | INCREASE ROTATION SPEED OF FIRST MOTOR AFTER 0.4 SECONDS | |
| 10 | 1 | 150 | NO | – | – | . . . |
| . . . | . . . | . . . | . . . | . . . | . . . | . . . |

| LENGTH OF FIRST LINE SEGMENT [mm] | LENGTH OF SECOND LINE SEGMENT [mm] | ANGLE [° ] | END POINT OF FIRST LINE SEGMENT | START POINT OF SECOND LINE SEGMENT | SPEED OF NOZZLE [mm/s] | NECESSITY OF CHANGE | CHANGE TARGET | CHANGE CONTENT | ... |
|---|---|---|---|---|---|---|---|---|---|
| 10 | 10 | 150 | (Xa, Ya) | (Xd, Yd) | v1 | NO | - | - | ... |
| 10 | 10 | 90 | (Xa, Ya) | (Xd, Yd) | v1 | YES | FIRST LINE SEGMENT | DECREASE ROTATION SPEED OF FIRST MOTOR FROM 0.5 SECONDS BEFORE | ... |
| 1 | 1 | 90 | (Xa, Ya) | (Xd, Yd) | v1 | YES | FIRST LINE SEGMENT | DECREASE ROTATION SPEED OF FIRST MOTOR FROM 1.2 SECONDS BEFORE | ... |
| | | | | | | | SECOND LINE SEGMENT | INCREASE ROTATION SPEED OF FIRST MOTOR AFTER 0.4 SECONDS | |
| 1 | 10 | 90 | (Xa, Ya) | (Xe, Ye) | v1 | YES | FIRST LINE SEGMENT | DECREASE ROTATION SPEED OF FIRST MOTOR FROM 1.2 SECONDS BEFORE | ... |
| 1 | 10 | 150 | (Xb, Yb) | (Xe, Ye) | v2 | NO | - | - | ... |
| 10 | 1 | 90 | (Xb, Yb) | (Xf, Yf) | v2 | YES | FIRST LINE SEGMENT | DECREASE ROTATION SPEED OF FIRST MOTOR FROM 0.5 SECONDS BEFORE | ... |
| | | | | | | | SECOND LINE SEGMENT | INCREASE ROTATION SPEED OF FIRST MOTOR AFTER 0.4 SECONDS | |
| 10 | 1 | 150 | (Xc, Yc) | (Xf, Yf) | v1 | NO | - | - | ... |
| ... | ... | ... | ... | ... | ... | ... | ... | ... | ... |

INFORMATION PROCESSING APPARATUS AND THREE-DIMENSIONAL SHAPING SYSTEM

The present application is based on, and claims priority from JP Application Serial Number 2023-077086, filed May 9, 2023, the disclosure of which is hereby incorporated by reference herein in its entirety.

BACKGROUND

1. Technical Field

The disclosure relates to an information processing apparatus and a three-dimensional shaping system.

2. Related Art

Research and development have been performed on a three-dimensional shaping apparatus that shapes a three-dimensional shaped object by stacking a shaping material that is at least partially melted.

In this regard, there is known a three-dimensional shaping system including a three-dimensional shaping apparatus and an information processing apparatus, in which the three-dimensional shaping apparatus includes a nozzle configured to dispense a shaping material toward a shaping table, an opening and closing mechanism configured to open and close a flow path of the shaping material that is coupled to the nozzle, a moving mechanism configured to change a relative position between the shaping table and the nozzle, and a control unit configured to control the opening and closing mechanism and the moving mechanism according to shaping data, the information processing apparatus includes a shaping data generation unit configured to generate, based on shaping path information including a shaping path indicating a relative movement direction and a relative movement distance of the nozzle with respect to the shaping table and a dispense parameter indicating dispensing of the shaping material, three-dimensional shaping data including execution command information indicating a command executed at each position on the shaping path, and transmit the generated three-dimensional shaping data to the three-dimensional shaping apparatus, and the command indicated by the execution command information includes an opening and closing command for driving the opening and closing mechanism (see JP-A-2019-155833).

JP-A-2019-155833 is an example of the related art.

However, in the three-dimensional shaping system disclosed in JP-A-2019-155833, positions at which various commands are executed among the positions on the shaping path may not be suitable for shaping a three-dimensional shaped object. It is undesirable because a shaping accuracy of the three-dimensional shaped object deteriorates.

SUMMARY

To solve the problem described above, an aspect of the present disclosure is an information processing apparatus for generating three-dimensional shaping data for causing a three-dimensional shaping apparatus to stack a plurality of slice layers as a three-dimensional shaped object having a predetermined shape, and the information processing apparatus includes: a generation unit configured to generate, based on shaping path information indicating a shaping path of a first slice layer among the plurality of slice layers, the three-dimensional shaping data including execution command information indicating a command to be executed at each position on the shaping path; an acquisition unit configured to acquire first line segment length information indicating a length of a first line segment among line segments included in the shaping path, second line segment length information indicating a length of a second line segment different from the first line segment among the line segments included in the shaping path, first line segment direction information indicating a direction in which the first line segment extends, and second line segment direction information indicating a direction in which the second line segment extends; and a change unit configured to change the execution command information generated by the generation unit based on the first line segment length information, the second line segment length information, the first line segment direction information, and the second line segment direction information which are acquired by the acquisition unit.

Another aspect of the present disclosure is a three-dimensional shaping system including the information processing apparatus described above and the three-dimensional shaping apparatus.

BRIEF DESCRIPTION OF THE DRAWINGS

FIG. 5 illustrates examples of a line segment marker added to the shaping path information illustrated in FIG. 2.

FIG. 6 is a diagram illustrating an example of the execution command information after the commands are added to the shaping path information illustrated in FIG. 5.

FIG. 7 is a diagram illustrating an example of second parameter information.

FIG. 8 is a diagram illustrating an example of a state after a position of the command in the execution command information illustrated in FIG. 6 is moved by processing in step S220.

FIG. 9 is a diagram illustrating another example of the second parameter information.

DESCRIPTION OF EMBODIMENTS

Embodiment

An embodiment of the present disclosure will now be described with reference to the drawings.

Overview of Three-Dimensional Shaping System

First, an overview of a three-dimensional shaping system according to the embodiment will be described.

The three-dimensional shaping system according to the embodiment includes an information processing apparatus and a three-dimensional shaping apparatus. Here, the information processing apparatus generates three-dimensional shaping data for causing the three-dimensional shaping apparatus to stack a plurality of slice layers as a three-dimensional shaped object having a predetermined shape. The information processing apparatus includes a generation unit, an acquisition unit, and a change unit. The generation unit generates, based on shaping path information indicating a shaping path of a first slice layer among the plurality of slice layers, the three-dimensional shaping data including execution command information indicating a command to be executed at each position on the shaping path. The acquisition unit acquires first line segment length information indicating a length of a first line segment among line segments included in the shaping path, second line segment length information indicating a length of a second line segment different from the first line segment among the line segments included in the shaping path, first line segment direction information indicating a direction in which the first line segment extends, and second line segment direction information indicating a direction in which the second line segment extends. Then, the change unit changes the execution command information generated by the generation unit based on the first line segment length information, the second line segment length information, the first line segment direction information, and the second line segment direction information which are acquired by the acquisition unit. Accordingly, the three-dimensional shaping system and the information processing apparatus can cause the three-dimensional shaping apparatus to execute an operation desired to be executed at a desired position, and can improve the shaping accuracy of the three-dimensional shaped object.

A configuration of the three-dimensional shaping system according to the embodiment and processing performed by the information processing apparatus provided in the three-dimensional shaping system will now be described in detail.

Configuration of Three-Dimensional Shaping System

The configuration of the three-dimensional shaping system according to the embodiment will now be described, taking a three-dimensional shaping system 1 as an example.

Figure 1:
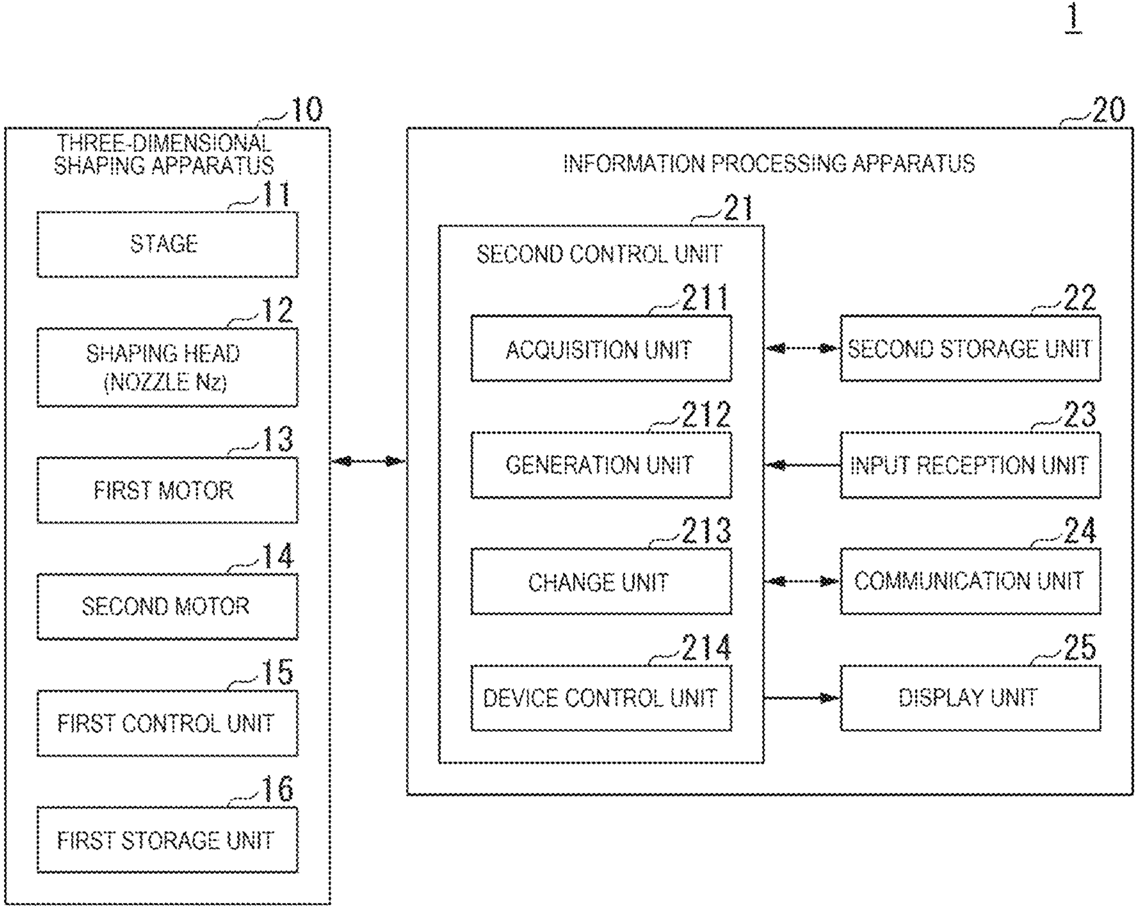
FIG. 1 is a diagram illustrating an example of a configuration of a three-dimensional shaping system 1.

FIG. 1 is a diagram illustrating an example of the configuration of the three-dimensional shaping system 1.

The three-dimensional shaping system 1 includes a three-dimensional shaping apparatus 10 and an information processing apparatus 20.

The three-dimensional shaping apparatus 10 shapes a three-dimensional shaped object by stacking a plurality of slice layers as a three-dimensional shaped object having a predetermined shape under control of the information processing apparatus 20.

The three-dimensional shaping apparatus 10 includes, for example, a stage 11, a shaping head 12, a first motor 13, a second motor 14, a first control unit 15, and a first storage unit 16. The three-dimensional shaping apparatus 10 may include other devices, other members, and the like in addition to the stage 11, the shaping head 12, the first motor 13, the second motor 14, the first control unit 15, and the first storage unit 16.

The stage 11 is a table having a shaping surface on which the three-dimensional shaped object is to be shaped.

The shaping head 12 includes a nozzle Nz that dispenses a shaping material onto the stage 11. The shaping head 12 is, for example, a printer head capable of adjusting a dispense amount of the shaping material per unit time. The shaping head 12 may be another device capable of dispensing the shaping material instead of the printer head.

The first motor 13 controls a flow rate of the shaping material supplied to the nozzle Nz of the shaping head 12.

The second motor 14 is a motor that drives a moving mechanism that changes a relative position of the stage 11 and the nozzle Nz. That is, the second motor 14 is a motor that changes the relative position of the stage 11 and the nozzle Nz.

The first control unit 15 includes a processor such as a central processing unit (CPU) or a field programmable gate array (FPGA), and controls the entire three-dimensional shaping apparatus 10. For example, the first control unit 15 controls each of the first motor 13 and the second motor 14 based on the execution command information included in the three-dimensional shaping data generated by the information processing apparatus 20. The execution command information is information including a command that can be executed by the first control unit 15. The execution command information will be described later.

The first storage unit 16 is a storage device such as a hard disk drive (HDD) or a solid state drive (SSD). The first storage unit 16 stores, for example, various types of information such as the three-dimensional shaping data.

The three-dimensional shaping apparatus 10 may have another configuration as long as the three-dimensional shaped object can be shaped.

The information processing apparatus 20 includes, for example, a second control unit 21, a second storage unit 22, an input reception unit 23, a communication unit 24, and a display unit 25. The information processing apparatus 20 may include other devices, other members, and the like in addition to the second control unit 21, the second storage unit 22, the input reception unit 23, the communication unit 24, and the display unit 25.

The second control unit 21 includes a processor such as a CPU or an FPGA, and controls the entire information processing apparatus 20. The second control unit 21 includes, for example, an acquisition unit 211, a generation unit 212, a change unit 213, and a device control unit 214. The functional units provided in the second control unit 21 are implemented by, for example, the processor executing various instructions (for example, a program and commands included in the program) stored in the second storage unit 22. A part or all of the functional units may be hardware functional units such as a large scale integration (LSI) or an application specific circuit (ASIC).

The acquisition unit 211 acquires various types of information.

The generation unit 212 generates the execution command information and the three-dimensional shaping data based on the various types of information acquired by the acquisition unit 211.

The change unit 213 changes the execution command information generated by the generation unit 212 based on the various types of information acquired by the acquisition unit 211.

The device control unit 214 controls the three-dimensional shaping apparatus 10 based on the three-dimensional shaping data generated by the generation unit 212.

A part or all of functions of the acquisition unit 211, the generation unit 212, the change unit 213, and the device control unit 214 may be integrated as one functional unit.

The second storage unit 22 is a storage device such as an HDD or an SSD.

The input reception unit 23 is an input device including a touch pad, a keyboard, a mouse, and the like. When the input reception unit 23 includes a touch pad, the touch pad may be integrated with the display unit 25 as a touch panel.

The communication unit 24 is a communication device that communicates with another device by at least one of a wired way or a wireless way. Hereinafter, as an example, a case in which the communication unit 24 is communicably connected to the information processing apparatus 20 by the wired way will be described.

The display unit 25 is a display device including a display.

Figure 2:
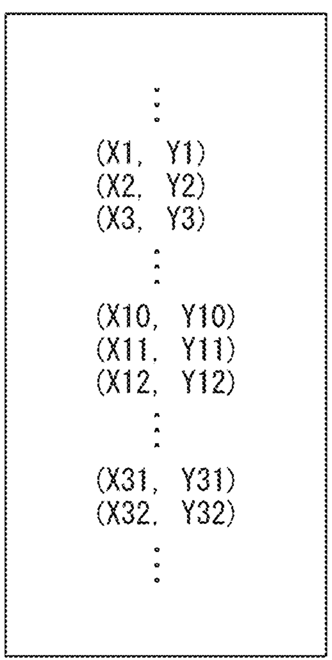
FIG. 2 is a diagram illustrating an example of shaping path information.

In the three-dimensional shaping system 1 implemented as described above, the information processing apparatus 20 receives shape information according to an operation received from a user. The shape information may be any information that indicates a shape of the three-dimensional shaped object and is, for example, computer aided design (CAD) data. After receiving the shape information, the information processing apparatus 20 generates an object having a shape indicated by the received shape information according to the operation received from the user. After generating the object, the information processing apparatus 20 virtually slices the generated object into a plurality of slice layers according to the operation received from the user, and generates slice layer information indicating each of the plurality of slice layers obtained by the slicing. After generating the slice layer information, the information processing apparatus 20 generates the shaping path information indicating the shaping path of the slice layer for each of the plurality of slice layers indicated by the slice layer information. A shaping path of a certain slice layer is a scanning path of the nozzle Nz that moves with respect to the stage 11 while dispensing the shaping material to the stage 11 when the slice layer is formed. In other words, a shaping path of a certain slice layer is a scanning path along which the nozzle Nz that moves while dispensing the shaping material moves along the shaping surface of the stage 11 when the slice layer is formed. The shaping path information may be any information capable of indicating the shaping path of the slice layer and is, for example, stereolithography (STL) data. FIG. 2 is a diagram illustrating an example of the shaping path information. As illustrated in FIG. 2, in the shaping path information, coordinates indicating positions at which a tip of the nozzle Nz of the shaping head 12 is located are aligned from top to bottom in an order in which the tip is located. For example, a position indicated by coordinates (X2, Y2) in FIG. 2 is a position at which the tip of the nozzle Nz of the shaping head 12 is located next to a position indicated by coordinates (X1, Y1).

After generating the shaping path information for each slice layer, the information processing apparatus 20 adds a command to be executed at each position on the shaping path indicated by the shaping path information to the shaping path information based on a command addition rule information stored in advance in the second storage unit 22 for the generated shaping path information for each slice layer, and generates the obtained information as the execution command information. That is, the execution command information described above is the shaping path information after the command is added. Therefore, the execution command information after the command is added to certain shaping path information indicates a shaping path indicated by the shaping path information. Here, a format of the command added to the shaping path information may be any format as long as the three-dimensional shaping apparatus 10 can execute an operation associated with the command and is, for example, G code. Examples of the command added to the shaping path information include a command for causing the three-dimensional shaping apparatus 10 to start various operations, a command for ending the operations, and a command for changing the operations, which are a command for starting rotation of the first motor 13, a command for increasing a rotation speed of the first motor 13, a command for decreasing the rotation speed of the first motor 13, a command for ending the rotation of the first motor 13, a command for starting rotation of the second motor 14, a command for increasing a rotation speed of the second motor 14, a command for decreasing the rotation speed of the second motor 14, a command for ending the rotation of the second motor 14, and are not limited thereto. The command addition rule information is information for defining what kind of command is added to which position on the shaping path according to a shape of the shaping path. The command addition rule information may be information that can be generated, edited, or deleted by the user, or may be predetermined information. Here, more specifically, the execution command information is information in which a command is added to at least a part of coordinates indicating each position on the shaping path in the shaping path information and is, for example, DAT data. After generating the execution command information for each slice layer, the information processing apparatus 20 generates the three-dimensional shaping data including the generated execution command information. The three-dimensional shaping data includes other information in addition to the execution command information. However, in the embodiment, description of the other information is omitted.

Figure 3:
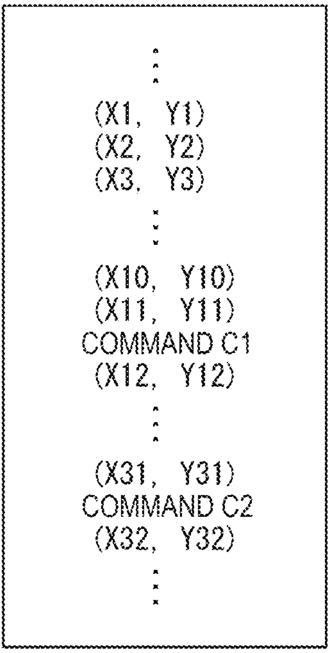
FIG. 3 is a diagram illustrating an example of execution command information after commands are added to the shaping path information illustrated in FIG. 2.

FIG. 3 is a diagram illustrating an example of the execution command information after the commands are added to the shaping path information illustrated in FIG. 2. As illustrated in FIG. 3, in the execution command information, a command associated with an operation desired to be executed by the three-dimensional shaping apparatus 10 at a position indicated by certain coordinates is disposed immediately below the coordinates. For example, in the example illustrated in FIG. 3, a command C1 is an example of a command associated with an operation desired to be executed by the three-dimensional shaping apparatus 10 at a position indicated by coordinates (X11, Y11). Further, for example, in the example, a command C2 is an example of a command associated with an operation desired to be executed by the three-dimensional shaping apparatus 10 at a position indicated by coordinates (X32, Y32). At positions indicated by coordinates at which no command is disposed immediately below, such as the coordinates (X1, Y1), the three-dimensional shaping apparatus 10 continues an operation executed by the three-dimensional shaping apparatus 10. For example, when the three-dimensional shaping apparatus 10 moves the shaping head 12 at a speed V1 before the tip of the nozzle Nz reaches the coordinates (X1, Y1) and the command C1 is a command for causing the three-dimensional shaping apparatus 10 to change a speed of the shaping head 12 to a speed V2, the three-dimensional shaping apparatus 10 moves the shaping head 12 at the speed V1 from the position indicated by the coordinates (X1, Y1) to the position indicated by the coordinates (X10, Y10), and moves the shaping head 12 at the speed V2 from the position indicated by the coordinates (X11, Y11). The command is an example of a command for changing the rotation speed of the second motor 14.

Here, in the execution command information generated based on the command addition rule information, positions at which various commands are executed among positions on the shaping path may not be suitable for shaping the three-dimensional shaped object. It is undesirable because a shaping accuracy of the three-dimensional shaped object deteriorates.

Therefore, based on the shaping path information indicating the shaping path of the slice layer, the information processing apparatus 20 acquires, for each of the plurality of slice layers indicated by the slice layer information, line segment length information indicating a length of each line segment included in the shaping path and line segment direction information indicating a direction in which each line segment included in the shaping path extends. Then, the information processing apparatus 20 changes the execution command information generated in advance based on the acquired line segment length information and the acquired line segment direction information. In other words, the information processing apparatus 20 corrects the execution command information generated in advance based on the acquired line segment length information and the acquired line segment direction information. Accordingly, the information processing apparatus 20 can make the positions at which various commands are executed among the positions on the shaping path suitable for shaping the three-dimensional shaped object in the execution command information. As a result, the information processing apparatus 20 can improve the shaping accuracy of the three-dimensional shaped object. Hereinafter, among the processing performed by the information processing apparatus 20, processing of changing the execution command information will be described in detail.

Processing of Changing Execution Command Information

Hereinafter, with reference to FIG. 4, the processing of changing the execution command information will be described as processing included in processing of generating the three-dimensional shaping data. The processing of changing the execution command information may be independent of the processing of generating the three-dimensional shaping data.

Figure 4:
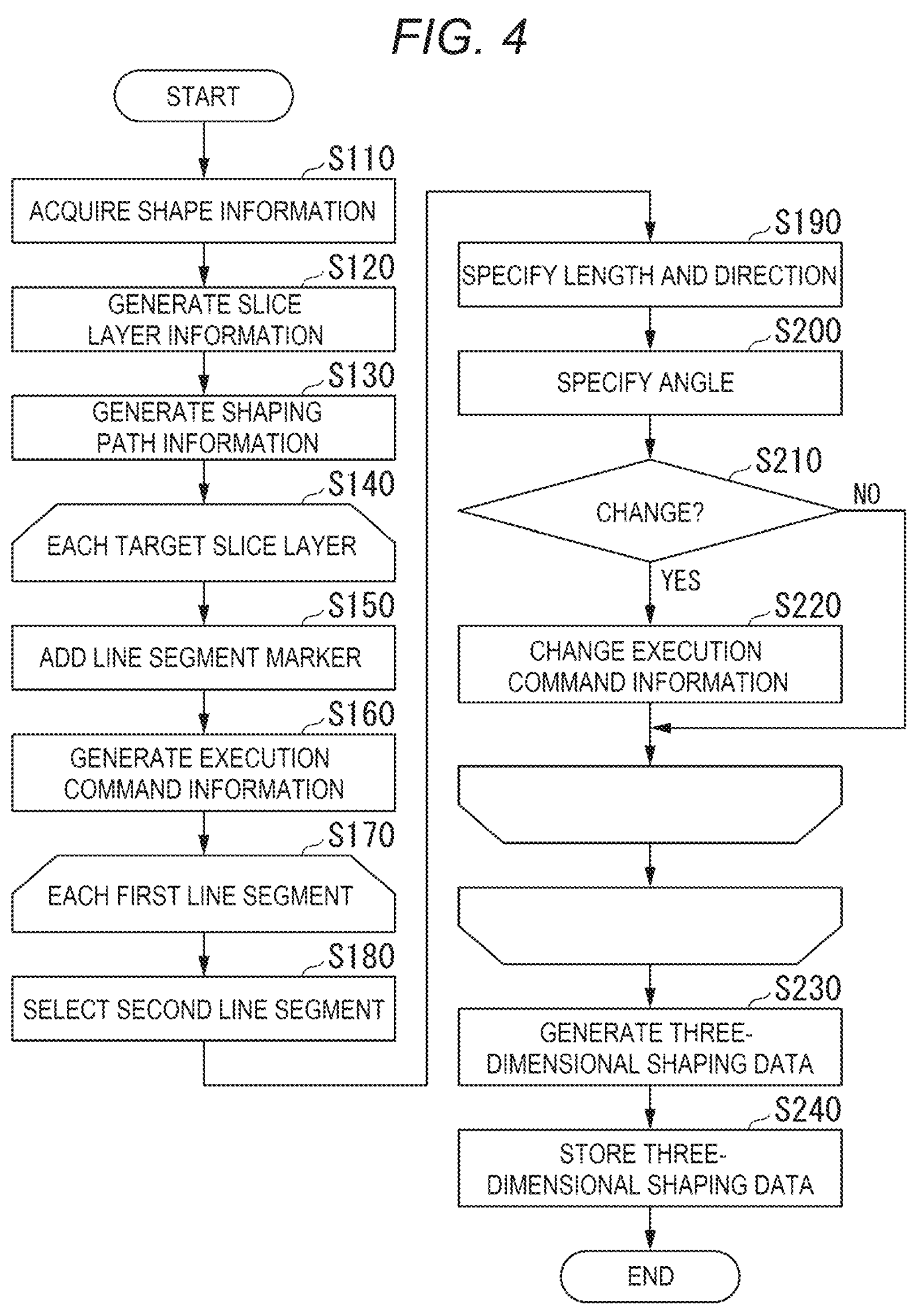
FIG. 4 is a diagram illustrating an example of a flow of processing of generating three-dimensional shaping data among processing executed by an information processing apparatus 20.

FIG. 4 is a diagram illustrating an example of a flow of the processing of generating the three-dimensional shaping data among the processing executed by the information processing apparatus 20. Hereinafter, as an example, a case will be described in which at a timing before processing in step S110 illustrated in FIG. 4 is executed, the information processing apparatus 20 receives a processing start operation for causing the information processing apparatus 20 to start generating the three-dimensional shaping data. Hereinafter, a case will be described as an example in which the shape information is stored in advance in the second storage unit 22 at the timing. Hereinafter, a case will be described as an example in which the command addition rule information described above is stored in advance in the second storage unit 22 at the timing. Hereinafter, a case will be described as an example in which first parameter information is stored in advance in the second storage unit 22 at the timing. The first parameter information is information indicating parameters received by the information processing apparatus 20 from the user among parameters related to the shaping of the three-dimensional shaped object. The first parameter information includes, for example, a parameter indicating a stacking pitch of the shaping material, a parameter indicating a filling density of the shaping material stacked in an infill region in the shaping material stacked as the three-dimensional shaped object, a parameter indicating a filling pattern of the shaping material in the infill region, and a parameter indicating a diameter of the nozzle Nz. Hereinafter, a case will be described as an example in which second parameter information is stored in advance in the second storage unit 22 at the timing. The second parameter information will be described later.

After the processing start operation is received, the acquisition unit 211 reads and acquires the shape information stored in advance in the second storage unit 22 from the second storage unit 22 (step S110). In step S110, the acquisition unit 211 may acquire the shape information from another device connected via the Internet, may acquire the shape information from an external flash memory, or may acquire the shape information by another method, instead of reading the shape information stored in the second storage unit 22 from the second storage unit 22.

Next, the generation unit 212 generates an object having a shape indicated by the shape information acquired by the acquisition unit 211 in step S110. Then, the generation unit 212 slices the generated object into a plurality of slice layers and generates the slice layer information indicating each of the plurality of slice layers obtained by the slicing (step S120). Here, when slicing the object into the plurality of slice layers in step S120, the generation unit 212 reads the first parameter information stored in advance in the second storage unit 22 from the second storage unit 22 and slices the object into the plurality of slice layers based on the read first parameter information. A method by which the generation unit 212 slices the object into the plurality of slice layers may be a known method or a method to be developed.

Next, based on the slice layer information generated in step S120, the generation unit 212 generates the shaping path information indicating the shaping path of the slice layer for each of the plurality of slice layers indicated by the slice layer information (step S130). Here, in step S130, the generation unit 212 stores the shaping path information indicating a shaping path of a certain slice layer in a lower layer of the slice layer information indicating the slice layer. A method of generating the shaping path information indicating the shaping path of each slice layer may be a known method or a method to be developed.

Next, the generation unit 212 selects each of the plurality of slice layers obtained by slicing the object in step S120 as a target slice layer one by one, and repeatedly performs processing in step S150 to step S220 for each selected target slice layer (step S140). In the embodiment, to clearly show the flow of the processing, a case will be described in which the generation unit 212 sequentially performs the processing in step S150 to step S220 every time the target slice layer is selected, but the processing in step S150 to step S220 repeatedly performed for each of the plurality of slice layers may be performed in parallel.

After the target slice layer is selected in step S140, the generation unit 212 adds a line segment marker to the shaping path information of the target slice layer generated in step S130 (step S150). Here, the processing in step S150 will be described. In step S150, the generation unit 212 performs the following processing as the processing of adding the line segment marker to the shaping path information. That is, the generation unit 212 selects line segments provided in the shaping path indicated by the shaping path information as target line segments one by one on the shaping path in order from the one closest to a start point of the shaping path. After selecting the target line segment, the generation unit 212 specifies coordinates of the start point of the selected target line segment and coordinates of an end point of the selected target line segment. Here, a start point of a certain line segment is a point closer to the start point of the shaping path on the shaping path including the line segment in two points of the line segment. An end point of a certain line segment is a point closer to the end point of the shaping path on the shaping path including the line segment in the two points of the line segment. The generation unit 212 adds, to the shaping path information, line segment start point information indicating that coordinates matching the coordinates of the start point of the target line segment among coordinates included in the shaping path information are the start point of the target line segment. For example, the generation unit 212 adds the line segment start point information immediately above the coordinates in the shaping path information. In addition, the generation unit 212 adds, to the shaping path information, line segment end point information indicating that coordinates matching the coordinates of the end point of the target line segment among the coordinates included in the shaping path information are the end point of the target line segment. For example, the generation unit 212 adds the line segment end point information immediately below the coordinates in the shaping path information. Here, the line segment start point information indicating a start point of a certain line segment may be any information capable of indicating the start point of the line segment, and is, for example, a marker indicating the start point of the line segment. The line segment end point information indicating an end point of a certain line segment may be any information capable of indicating the end point of the line segment, and is, for example, a marker indicating the end point of the line segment. Therefore, in the embodiment, unless there is a need to distinguish between the line segment start point information indicating a start point of a certain line segment and the line segment end point information indicating an end point of the line segment, the line segment start point information and the line segment end point information are collectively referred to as the line segment marker indicating the line segment as described above. The generation unit 212 repeatedly adds the line segment marker indicating the target line segment to the shaping path information every time the target line segment is selected.

FIG. 5 illustrates examples of the line segment marker added to the shaping path information illustrated in FIG. 2. In the example illustrated in FIG. 5, the generation unit 212 selects, as one line segment, a path from the position indicated by the coordinates (X1, Y1) to the position indicated by the coordinates (X11, Y11) in the shaping path indicated by the shaping path information illustrated in FIG. 2. In this case, the generation unit 212 specifies the coordinates (X1, Y1) as the coordinates of the start point of the one line segment, and specifies the coordinates (X11, Y11) as the coordinates of the end point of the one line segment. As a result, as illustrated in FIG. 5, the generation unit 212 adds a line segment start point marker S1 to the shaping path information as the line segment start point information indicating that the coordinates (X1, Y1) are the start point of the one line segment. In the example illustrated in FIG. 5, the line segment start point marker S1 is added immediately above the coordinates (X1, Y1) in the shaping path information. As illustrated in FIG. 5, the generation unit 212 adds a line segment end point marker G1 to the execution command information as the line segment end point information indicating that the coordinates (X11, Y11) are the end point of the one line segment. In the example, the line segment end point marker G1 is added immediately below the coordinates (X11, Y11) in the execution command information. That is, the line segment markers are added to the shaping path information to sandwich all the coordinates on the one line segment among the coordinates included in the shaping path information illustrated in FIG. 2. Accordingly, the line segment markers indicate the one line segment.

In the example illustrated in FIG. 5, the generation unit 212 similarly selects, as one line segment, a path from a position indicated by the coordinates (X12, Y12) to a position indicated by coordinates (X32, Y32) in the shaping path indicated by the shaping path information illustrated in FIG. 2. Therefore, as illustrated in FIG. 5, the generation unit 212 adds a line segment start point marker S2 to the execution command information as the line segment start point information indicating that the coordinates (X12, Y12) are a start point of the one line segment. In the example illustrated in FIG. 5, the line segment start point marker S2 is added immediately above the coordinates (X12, Y12) in the shaping path information. As illustrated in FIG. 5, the generation unit 212 adds a line segment end point marker G2 to the execution command information as the line segment end point information indicating that the coordinates (X32, Y32) are an end point of the one line segment. That is, the line segment markers are added to the shaping path information to sandwich all the coordinates on the one line segment among the coordinates included in the shaping path information illustrated in FIG. 2. Accordingly, the line segment markers indicate the one line segment.

Next, the generation unit 212 reads the command addition rule information stored in advance in the second storage unit 22 from the second storage unit 22. Then, based on the read command addition rule information and the shaping path information to which the line segment marker is added in step S150, the generation unit 212 generates the execution command information indicating the command to be executed at each position on the shaping path indicated by the shaping path information (step S160). A method by which the generation unit 212 generates the execution command information based on the command addition rule information and the shaping path information may be a known method or a method to be developed. FIG. 6 is a diagram illustrating an example of execution command information after the commands are added to the shaping path information illustrated in FIG. 5. In the example illustrated in FIG. 6, similarly to the execution command information illustrated in FIG. 3, the command C1 is added immediately below the coordinates (X11, Y11). In the example, similarly to the execution command information illustrated in FIG. 3, the command C2 is added immediately below the coordinates (X31, Y31).

Next, the generation unit 212 selects the line segments indicated by the respective line segment markers included in the execution command information generated in step S160 as first line segments one by one on the shaping path indicated by the execution command information in order from the one closest to the start point of the shaping path, and repeatedly performs processing in step S180 to step S220 for each selected first line segment (step S170). The repeated processing in step S180 to step S220 may be performed in parallel. In step S170, the generation unit 212 may select the line segments indicated by the respective line segment markers included in the shaping path information to which the line segment markers are added in step S150 as the first line segments one by one on the shaping path indicated by the shaping path information in order from the one closest to the start point of the shaping path.

After the first line segment is selected in step S170, the generation unit 212 selects, as the second line segment, a line segment that is located adjacent to the first line segment and is closer to the end point of the shaping path on the shaping path indicated by the execution command information generated in step S160 (step S180).

Next, the acquisition unit 211 acquires the first line segment length information indicating the length of the first line segment selected in step S170, the second line segment length information indicating the length of the second line segment selected in step S180, the first line segment direction information indicating the direction in which the first line segment extends, and the second line segment direction information indicating the direction in which the second line segment extends based on the execution command information generated by the generation unit 212 in step S160 (step S190). A method of acquiring the first line segment length information, the second line segment length information, the first line segment direction information, and the second line segment direction information by the acquisition unit 211 may be a known method or a method to be developed. In FIG. 4, the processing in step S190 is indicated by "specify length and direction".

Next, the change unit 213 specifies an angle between the first line segment and the second line segment as a line segment angle based on the first line segment direction information and the second line segment direction information acquired by the acquisition unit 211 in step S190 (step S200). A method of specifying the line segment angle by the change unit 213 may be a known method or a method to be developed.

Next, the change unit 213 reads the second parameter information stored in advance in the second storage unit 22 from the second storage unit 22. Then, the change unit 213 determines whether to change information on at least one of the first line segment or the second line segment in the execution command information based on the read second parameter information, the first line segment length information and the second line segment length information acquired by the acquisition unit 211 in step S190, and the line segment angle specified in step S200 (step S210). Here, the processing in step S210 will be described.

First, the second parameter information will be described. The second parameter information is information including information indicating parameters received in advance from the user by the information processing apparatus 20 as information on the change of the execution command information. FIG. 7 is a diagram illustrating an example of the second parameter information. In the example illustrated in FIG. 7, the second parameter information is information in which the first line segment length information, the second line segment length information, line segment angle information indicating the line segment angle, change necessity information indicating necessity of change, change target information indicating a line segment associated with a command to be changed, and the change content information indicating a change content are associated with one another. Here, a command associated with a certain line segment is a command associated with an operation to be executed by the three-dimensional shaping apparatus 10 at any position on the line segment. In FIG. 7, the first line segment length information is indicated by "length of first line segment [mm]". In FIG. 7, the second line segment length information is indicated by "length of second line segment [mm]". In FIG. 7, the line segment angle information is indicated by "angle [°]". In FIG. 7, the change necessity information is indicated by "necessity of change". In FIG. 7, the change target information is indicated by "change target". In FIG. 7, the change content information is indicated by "change content". In the second parameter information, other information may be further associated with the first line segment length information, the second line segment length information, the line segment angle information, the change necessity information, the change target information, and the change content information.

For example, the uppermost record in the second parameter information illustrated in FIG. 7 indicates that there is no need to change the execution command information when the length of the first line segment is 10 [mm], the length of the second line segment is 10 [mm], and the line segment angle is 150 [°].

For example, a second record from the top in the second parameter information illustrated in FIG. 7 indicates that it is necessary to change the execution command information when the length of the first line segment is 10 [mm], the length of the second line segment is 10 [mm], and the line segment angle is 90 [°]. In this case, the record indicates a command associated with the first line segment as the command to be changed. In this case, the record indicates that, as a change content, a position at which the three-dimensional shaping apparatus 10 is caused to perform an operation associated with the command for decreasing the rotation speed of the first motor 13 is changed from a pre-change position P1 to a post-change position P2 in the execution command information. Here, the pre-change position P1 is a position among positions on the first line segment at which the three-dimensional shaping apparatus 10 is caused to perform the operation associated with the command for decreasing the rotation speed of the first motor 13. The post-change position P2 is a position among the positions on the first line segment at which the nozzle Nz of the shaping head 12 is located at a timing 0.5 seconds before a timing at which the nozzle Nz of the shaping head 12 is located at the pre-change position. The post-change position P2 is indicated by time such as "0.5 seconds before", and may be indicated by other parameters such as a distance and coordinates instead.

For example, a third record from the top in the second parameter information illustrated in FIG. 7 indicates that it is necessary to change the execution command information when the length of the first line segment is 1 [mm], the length of the second line segment is 1 [mm], and the line segment angle is 90 [°]. In this case, the record indicates commands associated with the first line segment and the second line segment respectively as the command to be changed. In this case, the record indicates that, as the change content, the position at which the three-dimensional shaping apparatus 10 is caused to perform the operation associated with the command for decreasing the rotation speed of the first motor 13 is changed from a pre-change position P3 to a post-change position P4 in the execution command information. Here, the pre-change position P3 is a position among the positions on the first line segment at which the three-dimensional shaping apparatus 10 is caused to perform the operation associated with the command for decreasing the rotation speed of the first motor 13. The post-change position P4 is a position among the positions on the first line segment at which the nozzle Nz of the shaping head 12 is located at a timing 1.2 seconds before the timing at which the nozzle Nz of the shaping head 12 is located at the pre-change position. The post-change position P4 is indicated by time such as "1.2 seconds before", and may be indicated by other parameters such as a distance and coordinates instead. In this case, the record indicates that, as the change content, a position at which the three-dimensional shaping apparatus 10 is caused to perform an operation associated with the command for increasing the rotation speed of the first motor 13 is changed from a pre-change position P5 to a post-change position P6 in the execution command information. Here, the pre-change position P5 is a position among positions on the second line segment at which the three-dimensional shaping apparatus 10 is caused to perform the operation associated with the command for increasing the rotation speed of the first motor 13. The post-change position P6 is a position among the positions on the second line segment at which the nozzle Nz of the shaping head 12 is located at a timing 0.4 seconds after a timing at which the nozzle Nz of the shaping head 12 is located at the pre-change position. The post-change position P6 is indicated by time such as "0.4 seconds after", and may be indicated by other parameters such as a distance and coordinates instead.

In the second parameter information, the first line segment length information may be replaced with information indicating a range in which the length of the first line segment is included. In the second parameter information, the second line segment length information may be replaced with information indicating a range in which the length of the second line segment is included. Further, in the second parameter information, the line segment angle information may be replaced with information indicating a range in which the line segment angle is included.

In step S210, the change unit 213 specifies a record including three parameters including the length of the first line segment indicated by the first line segment length information, the length of the second line segment indicated by the second line segment length information, and the angle indicated by the line segment angle from the records included in such second parameter information. Then, the change unit 213 determines whether to change information on at least one of the first line segment or the second line segment in the execution command information based on the change necessity information associated with the specified record. That is, when the change unit 213 determines that there is no need to change the execution command information, the change unit 213 determines not to change information on both the first line segment and the second line segment in the execution command information. On the other hand, when the change unit 213 determines that it is necessary to change the execution command information, the change unit 213 determines to change the information on at least one of the first line segment or the second line segment in the execution command information. Hereinafter, for convenience of description, the record is referred to as a target record.

In step S210, when the change unit 213 determines not to change the information on both the first line segment and the second line segment in the execution command information (NO in step S210), the generation unit 212 proceeds to step S170 and selects the next first line segment. Here, when there is no unselected line segment as the first line segment in step S170, the generation unit 212 proceeds to step S140 and selects the next target slice layer. Further, when there is no unselected slice layer as the target slice layer in step S140, the generation unit 212 ends the repeated processing in step S140 to step S220 and proceeds to step S230.

On the other hand, when the change unit 213 determines to change the information on at least one of the first line segment or the second line segment in the execution command information (YES in step S210), the change unit 213 specifies the command to be changed and the change content based on the target record specified in step S210. Then, the change unit 213 changes a position of the specified command on the execution command information (step S220). In FIG. 4, the processing in step S220 is indicated by "change execution command information". For example, when the target record specified in step S210 is the second record from the top in the second parameter information illustrated in FIG. 7, the change unit 213 changes the position at which the three-dimensional shaping apparatus 10 is caused to perform the operation associated with the command for decreasing the rotation speed of the first motor 13 from the pre-change position P1 to the post-change position P2 in the execution command information.

Figure 8:
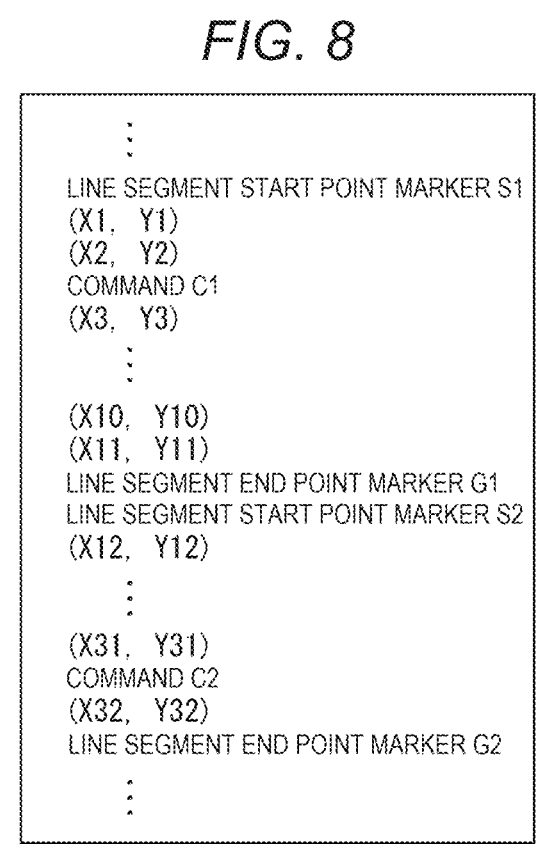

Here, FIG. 8 is a diagram illustrating an example of a state after the position of the command in the execution command information illustrated in FIG. 6 is moved by the processing in step S220. In the example illustrated in FIG. 8, the position of the command C1 located immediately below the coordinates (X11, Y1l) is changed to a position immediately below the coordinates (X2, Y2). This is because the change unit 213 changes the position of the command C1 based on the second parameter information. Meanwhile, in the example, the position of the command C2 located immediately below the coordinates (X31, Y31) is not changed. This is because the change unit 213 does not change the position of the command C2 based on the second parameter information.

In this way, the information processing apparatus 20 changes the generated execution command information based on the first line segment length information, the second line segment length information, the first line segment direction information, and the second line segment direction information. Accordingly, the information processing apparatus 20 can make the positions at which various commands are executed among the positions on the shaping path suitable for shaping the three-dimensional shaped object in the execution command information. As a result, the information processing apparatus 20 can improve the shaping accuracy of the three-dimensional shaped object.

After the processing in step S220 is performed, the generation unit 212 proceeds to step S170 and selects the next first line segment. Here, when there is no unselected line segment as the first line segment in step S170, the generation unit 212 proceeds to step S140 and selects the next target slice layer. Further, when there is no unselected slice layer as the target slice layer in step S140, the generation unit 212 ends the repeated processing in step S140 to step S220 and proceeds to step S230.

After the repeated processing in step S140 to step S220 is ended, the generation unit 212 generates the three-dimensional shaping data including the execution command information changed by the repeated processing (step S230).

Next, the generation unit 212 stores the three-dimensional shaping data generated in step S230 in the second storage unit 22 (step S240), and ends the processing of the flowchart illustrated in FIG. 4.

In this way, the information processing apparatus 20 is an information processing apparatus that generates the three-dimensional shaping data for causing the three-dimensional shaping apparatus 10 to form the plurality of slice layers as the three-dimensional shaped object having a predetermined shape. Further, the information processing apparatus 20 includes the generation unit 212 configured to generate, based on the shaping path information indicating the shaping path of the first slice layer among the plurality of slice layers, the three-dimensional shaping data including the execution command information indicating the command to be executed at each position on the shaping path, the acquisition unit 211 configured to acquire the first line segment length information indicating the length of the first line segment among the line segments included in the shaping path, the second line segment length information indicating the length of the second line segment different from the first line segment among the line segments included in the shaping path, the first line segment direction information indicating the direction in which the first line segment extends, and the second line segment direction information indicating the direction in which the second line segment extends, and the change unit 213 configured to change the execution command information generated by the generation unit 212 based on the first line segment length information, the second line segment length information, the first line segment direction information, and the second line segment direction information which are acquired by the acquisition unit 211. Accordingly, the information processing apparatus 20 can make the positions at which various commands are executed among the positions on the shaping path suitable for shaping the three-dimensional shaped object in the execution command information. As a result, the information processing apparatus 20 can improve the shaping accuracy of the three-dimensional shaped object.

For example, the device control unit 214 can control the three-dimensional shaping apparatus 10 by outputting the three-dimensional shaping data stored in the second storage unit 22 in step S240 to the three-dimensional shaping apparatus 10. In this case, the first control unit 15 of the three-dimensional shaping apparatus 10 operates the three-dimensional shaping apparatus 10 based on the three-dimensional shaping data acquired from the information processing apparatus 20 to shape the three-dimensional shaped object. Accordingly, for example, the first control unit 15 can drive the first motor 13 at a first rotation speed when the shaping material is dispensed from the nozzle Nz along a straight line having a length equal to or larger than a predetermined value, and can drive the first motor 13 at a second rotation speed less than the first rotation speed when the shaping material is dispensed from the nozzle Nz along a straight line having a length less than the predetermined value. As a result, the three-dimensional shaping apparatus 10 can improve the shaping accuracy of the three-dimensional shaped object.

The acquisition unit 211 described above may acquire the first line segment end point information, the second line segment start point information, and movement speed information based on the execution command information in step S190 in addition to the first line segment length information, the second line segment length information, the first line segment direction information, and the second line segment direction information. Here, the first line segment end point information is information indicating the end point of the first line segment. The second line segment start point information is information indicating the start point of the second line segment. The movement speed information is information indicating a movement speed of the nozzle Nz moved by the three-dimensional shaping apparatus 10 along the shaping path indicated by the execution command information. In this case, in step S220, the change unit 213 changes the execution command information based on the first line segment length information, the second line segment length information, the line segment angle information, the first line segment end point information, the second line segment start point information, and the movement speed information. Accordingly, the information processing apparatus 20 can more reliably make the positions at which various commands are executed among the positions on the shaping path suitable for shaping the three-dimensional shaped object in the execution command information. For example, when the end point indicated by the first line segment end point information and the start point indicated by the second line segment start point information match, it is understood that the first line segment and the second line segment are directly coupled. On the other hand, for example, when the end point indicated by the first line segment end point information and the start point indicated by the second line segment start point information do not match, it is understood that the first line segment and the second line segment are coupled via a path close to a curved line or a curved path. Therefore, in this case, the change unit 213 can change the position of the command according to a way of coupling the first line segment and the second line segment. In this case, the change unit 213 can also change the position of the command according to the movement speed of the nozzle Nz. As a result, the information processing apparatus 20 can more finely change the positions of the commands in the execution command information, and as a result, in the execution command information, the positions at which various commands are executed among the positions on the shaping path can be more reliably made suitable for shaping the three-dimensional shaped object.

When the acquisition unit 211 acquires the first line segment length information, the second line segment length information, the first line segment direction information, the second line segment direction information, the first line segment end point information, the second line segment start point information, and the movement speed information in step S190, the second parameter information is information as illustrated in FIG. 9. FIG. 9 is a diagram illustrating another example of the second parameter information. In the example illustrated in FIG. 9, the second parameter information is information in which the first line segment length information, the second line segment length information, the line segment angle information, the first line segment end point information, the second line segment start point information, the movement speed information, the change necessity information, the change target information, and the change content information are associated with one another. In FIG. 9, the first line segment length information is indicated by “length of first line segment [mm]”. In FIG. 9, the second line segment length information is indicated by “length of second line segment [mm]”. In FIG. 9, the line segment angle information is indicated by “angle [°]”. In FIG. 9, the first line segment end point information is indicated by “end point of first line segment”. In FIG. 9, the second line segment start point information is indicated by “start point of second line segment”. In FIG. 9, the movement speed information is indicated by “speed of nozzle [mm/s]”. In FIG. 9, the change necessity information is indicated by “necessity of change”. In FIG. 9, the change target information is indicated by “change target”. In FIG. 9, the change content information is indicated by “change content”. In the second parameter information illustrated in FIG. 9, other information may be further associated with the first line segment length information, the second line segment length information, the line segment angle information, the first line segment end point information, the second line segment start point information, the movement speed information, the change necessity information, the change target information, and the change content information.

Further, the contents described above may be combined in any manner.

APPENDIX

[1]

An information processing apparatus for generating three-dimensional shaping data for causing a three-dimensional shaping apparatus to stack a plurality of slice layers as a three-dimensional shaped object having a predetermined shape, the information processing apparatus includes: a generation unit configured to generate, based on shaping path information indicating a shaping path of a first slice layer among the plurality of slice layers, the three-dimensional shaping data including execution command information indicating a command to be executed at each position on the shaping path; an acquisition unit configured to acquire first line segment length information indicating a length of a first line segment among line segments included in the shaping path, second line segment length information indicating a length of a second line segment different from the first line segment among the line segments included in the shaping path, first line segment direction information indicating a direction in which the first line segment extends, and second line segment direction information indicating a direction in which the second line segment extends; and a change unit configured to change the execution command information generated by the generation unit based on the first line segment length information, the second line segment length information, the first line segment direction information, and the second line segment direction information which are acquired by the acquisition unit.

[2]

The information processing apparatus according to [1], in which the generation unit generates the shaping path information based on slice layer information indicating the first slice layer.

[3]

The information processing apparatus according to [2], in which the generation unit generates the slice layer information based on shape information indicating a shape of the three-dimensional shaped object.

[4]

The information processing apparatus according to any one of [1] to [3], in which the acquisition unit acquires, based on the execution command information, first line segment end point information indicating an end point of the first line segment, second line segment start point information indicating a start point of the second line segment, and movement speed information indicating a movement speed of a nozzle moved by the three-dimensional shaping apparatus along the shaping path indicated by the shaping path information, and the change unit changes the execution command information generated by the generation unit based on the first line segment length information, the second line segment length information, the first line segment direction information, the second line segment direction information, the first line segment end point information, the second line segment start point information, and the movement speed information which are acquired by the acquisition unit.

[5]

A three-dimensional shaping system includes: the information processing apparatus according to any one of [1] to [4]; and the three-dimensional shaping apparatus.

[6]

The three-dimensional shaping system according to [5], in which the three-dimensional shaping apparatus includes a stage configured to allow the three-dimensional shaped object to be shaped, a nozzle configured to dispense a shaping material onto the stage, a first motor configured to control a flow rate of the shaping material supplied to the nozzle, a second motor configured to change a relative position between the stage and the nozzle, a control unit configured to control each of the first motor and the second motor based on the execution command information, and a storage unit configured to store the three-dimensional shaping data, and the control unit drives the first motor at a first rotation speed when the shaping material is dispensed from the nozzle along a straight line having a length equal to or larger than a predetermined value, and drives the first motor at a second rotation speed less than the first rotation speed when the shaping material is dispensed from the nozzle along a straight line having a length less than the predetermined value.

While the embodiment of the present disclosure has been described in detail with reference to the drawings, the specific configuration thereof is not limited to the embodiment and may be changed, replaced, deleted, or the like without departing from the spirit and scope of the present disclosure.

Further, a program for implementing a function of any component in the apparatus described above may be recorded in a computer-readable recording medium, and the program may be read and executed by a computer system. Here, the apparatus is, for example, the three-dimensional shaping apparatus 10 and the information processing apparatus 20. Here, the term “computer system” includes an operating system (OS) and hardware such as peripheral devices. The “computer-readable recording medium” refers to a storage device such as a portable medium such as a flexible disk, a magneto-optical disk, a ROM, and a compact disk (CD) ROM, and a hard disk built in the computer system. Further, the “computer-readable recording medium” includes a medium that stores the program for a certain period of time, such as a volatile memory inside the computer system serving as a server or a client when the program is transmitted via a network such as the Internet or a communication line such as a telephone line.

The program may be transmitted from the computer system in which the program is stored in the storage device to another computer system via a transmission medium or a transmission wave in the transmission medium. Here, the “transmission medium” for transmitting the program refers to a medium having a function of transmitting information such as a network such as the Internet or a communication line such as a telephone line.

The program may be a program for implementing a part of the functions described above. Further, the program may be a so-called difference file or a differential program for implementing the above-described functions in combination with the program recorded in the computer system.

What is claimed is:

1. An information processing apparatus for generating three-dimensional shaping data for causing a three-dimensional shaping apparatus to stack a plurality of slice layers as a three-dimensional shaped object having a predetermined shape, the information processing apparatus comprising:

a memory configured to store a program; and a processor configured to execute the program so as to:

generate, based on shaping path information indicating a shaping path of a first slice layer among the plurality of slice layers, the three-dimensional shaping data including execution command information indicating a command to be executed at each position on the shaping path;

acquire:

first line segment length information indicating a length of a first line segment among line segments included in the shaping path;

first line segment direction information indicating a direction in which the first line segment extends;

second line segment length information indicating a length of a second line segment continuously extending from the first line segment among the line segments included in the shaping path;

second line segment direction information indicating a direction in which the second line segment extends; and line segment angle information indicating an angle between the first and second line segments;

determine whether the angle of the line segment information exceeds a predetermined angle to generate a first determination result;

determine whether each of the length of the first line segment and the length of the second line segment exceeds a predetermined length to generate a second determination result;

change the execution command information by adding another command therein to generate changed execution command information; and send the changed execution command information to the three- dimensional shaping apparatus by which the three-dimensional shaped object is formed, wherein the another command relates to controlling a first motor that is configured to change a flow rate of a shaping material supplied to a nozzle based on the first and second determination results.

2. The information processing apparatus according to claim 1, wherein the processor is configured to generate the shaping path information based on slice layer information indicating the first slice layer.

3. The information processing apparatus according to claim 2, wherein the processor is further configured to generate the slice layer information based on shape information indicating a shape of the three-dimensional shaped object.

4. The information processing apparatus according to claim 1, wherein the processor is further configured to:

acquire, based on the execution command information, first line segment end point information indicating an end point of the first line segment, second line segment start point information indicating a start point of the second line segment, and movement speed information indicating a movement speed of a nozzle moved by the three-dimensional shaping apparatus along the shaping path indicated by the shaping path information, and change the execution command information based on the first line segment length information, the second line segment length information, the first line segment direction information, the second line segment direction information, the first line segment end point information, the second line segment start point information, and the movement speed information.

5. A three-dimensional shaping system comprising:

the information processing apparatus according to claim 1; and the three-dimensional shaping apparatus.

6. The three-dimensional shaping system according to claim 5, wherein the three-dimensional shaping apparatus includes a stage configured to allow the three-dimensional shaped object to be shaped, a nozzle configured to dispense a shaping material onto the stage, the first motor configured to control the flow rate of the shaping material supplied to the nozzle, a second motor configured to change a relative position between the stage and the nozzle, another processor configured to control each of the first motor and the second motor based on the execution command information, and another memory configured to store the three-dimensional shaping data, and the another processor is configured to drive the first motor at a first rotation speed when the shaping material is dispensed from the nozzle along a straight line having a length equal to or larger than a predetermined value, and drive the first motor at a second rotation speed less than the first rotation speed when the shaping material is dispensed from the nozzle along a straight line having a length less than the predetermined value.

* * * * *